United States Patent [19]

Winner et al.

[11] Patent Number: 4,640,048

[45] Date of Patent: Feb. 3, 1987

[54] WINDOW SASH ASSEMBLY

[76] Inventors: Kurt W. Winner, 22 Fairmount Ave., Mahwah, N.J. 07430; Ignazio Cangialosi, 5 Rock Rd., Hawthorne, N.J. 07506

[21] Appl. No.: 638,129

[22] Filed: Aug. 6, 1984

[51] Int. Cl.$^4$ .............................................. E05D 15/22
[52] U.S. Cl. ....................................... 49/181; 403/402; 52/656; 49/449
[58] Field of Search ........................ 49/181, 449, 501; 160/381; 403/401, 402; 52/656

[56] References Cited

U.S. PATENT DOCUMENTS

| | | | |
|---|---|---|---|
| 3,114,943 | 12/1963 | Casebolt | 52/656 |
| 3,342,514 | 9/1967 | Ivanhoe et al. | 52/656 X |
| 3,899,258 | 8/1975 | Matthews | 52/656 X |
| 4,024,690 | 5/1977 | Collins et al. | 49/449 X |
| 4,079,549 | 3/1978 | Wood | 49/181 |
| 4,106,239 | 8/1978 | Bancroft et al. | 49/449 |
| 4,144,674 | 3/1979 | Douman | 49/181 X |
| 4,475,311 | 10/1984 | Gibson | 49/449 X |
| 4,503,640 | 3/1985 | Stern | 49/501 X |

*Primary Examiner*—Peter A. Aschenbrenner

*Attorney, Agent, or Firm*—Ostrolenk, Faber, Gerb & Soffen

[57] ABSTRACT

A window sash formed preferably of plastic and having a pair of horizontal upper and lower rails and vertical stiles. The rails and stiles are extruded to form a principal outside edge wall for the sash and a plurality of additional walls and bosses within each of the rails and stiles perpendicular to said outside wall, including a pair of walls forming a channel with said outside walls. The stiles and rails are diagonally cut at the ends to form a miter joint. The miter joint is integrated by a single screw passing at each corner from the rail into the stile. One or more of the bosses and walls within the rail forms a support for the screw at each corner which will prevent angling of the screw. Each of the stiles has at least one boss for receiving the screw, said boss extending longitudinally of the stile. The single screw at each corner is therefore anchored against any angling both with respect to the rail and the stile and thereby forms a secure, non-slip miter joint. Additional elements such as the pivot bars are supported by the lower rail so that the sash may be swung in and one or more latches at the upper rail may be provided to guide the sash vertically until it is desired to swing in the sash.

9 Claims, 7 Drawing Figures

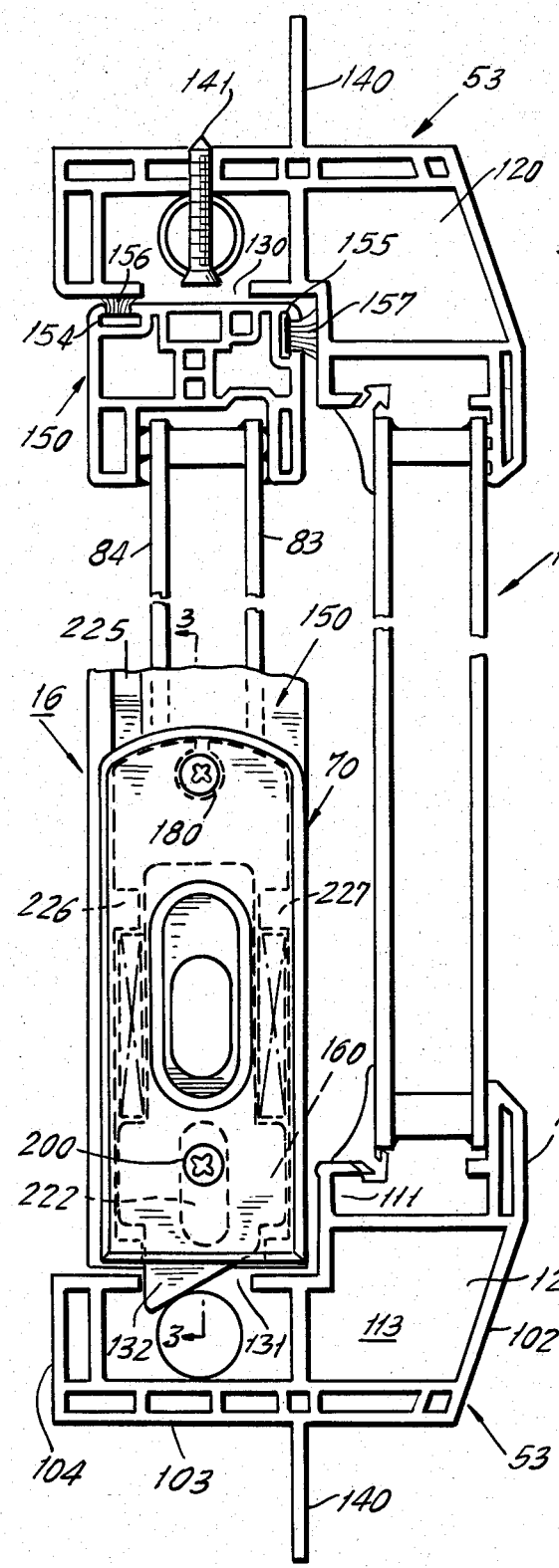
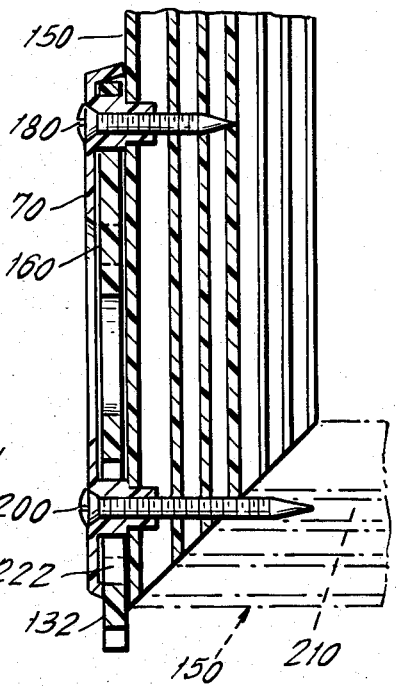
FIG. 2.
FIG. 3.

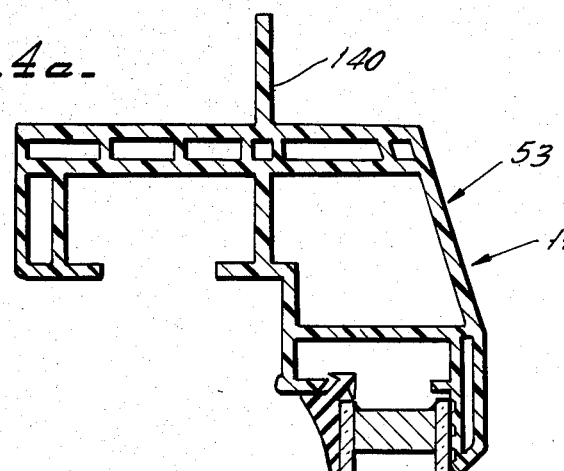
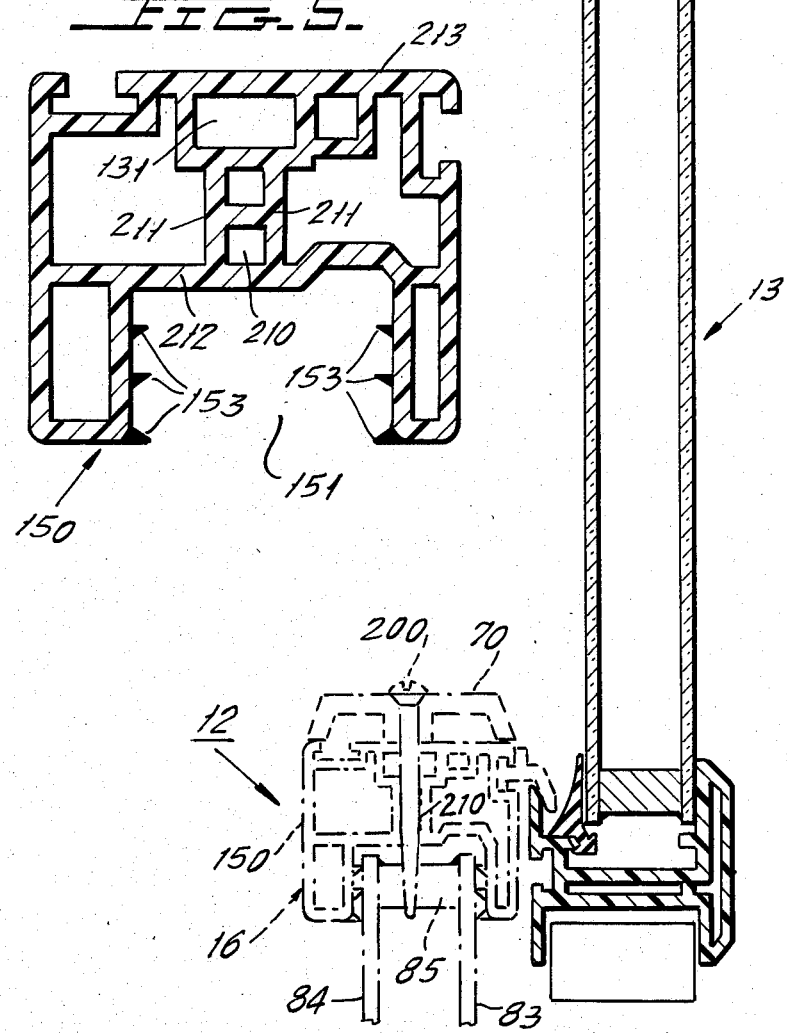

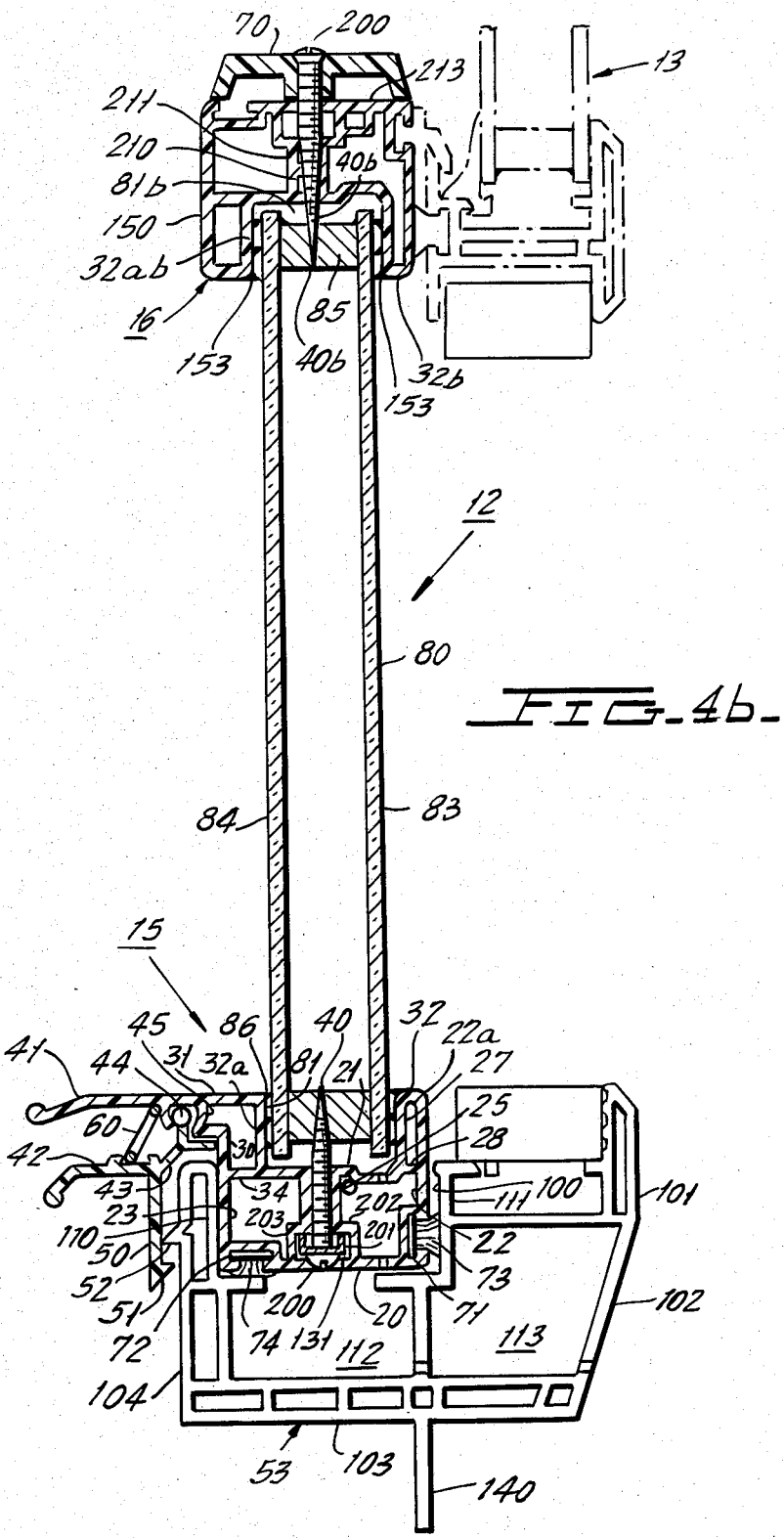

4,640,048

WINDOW SASH ASSEMBLY

The present invention relates to window sashes, and more particularly to a window sash which is constructed from extruded multiple hollow plastic members adapted to permit rapid, accurate, high-production assembly of a mitered sash in which both the lower lift rail and the upper rail are secured to the stiles at mitered corners by the use of a single screw at each corner. These extended plastic members have outer parallel walls and inner longitudinal walls and sections supported with respect to each other by integral internal bosses which in turn serve not only to support the outer parallel walls but also to create additional dead air spaces and which further serve to support the structure itself against distortion collapse or deformation by the screws as they are driven in. These multiple internal hollow bosses thereby perform a multiplicity of functions.

The bosses act as a pilot for the screw when inserted at the corners from the rails into the stiles providing predictable limited slippage at the miters during assembly and providing for accurate alignment of a miter joint and thereby presenting a secure miter structure which will not slip for practical purposes and these will not result in distortion or unsightly appearance of the sash.

They act to contain and maintain alignment of pivot bars in a sash which is to be pivoted by using one less screw per bar than is normally used. They act also to support other devices such as latches and the abovementioned pivot bars as well as corner assembly bosses thereby making the single screw at each corner perform a dual purpose.

As an important contribution, the bosses prevent buckling of the outer walls or misalignment of the miters under screw pressure. They act further as internal longitudinal stiffeners of the sash extrusion. They act as a further secondary screw hold when, for instance, a latch assembly is added. They act to provide a stronger joint than is normally achieved even in a multiple securement corner arrangement.

As above pointed out they provide additional dead air spaces for better insulation. They further permit pivot bars and pivot bar screws to be concealed and protect it from the weather and deleterious atmosphere as well as improving the appearance of the sash.

They permit hole punching to be made without the need for die support horns.

These internal bosses in the extrusions therefore replace the aluminum internal stiffener or other hardware normally required in a sash which necessitates the use of extra material and extra assembly time and thereby eliminate the need for the special machinery normally used to cut and align and install such extra reinforcing inserts.

BRIEF DESCRIPTION OF THE DRAWINGS

FIG. 2 is a view partly in cross-section of the top of the sash of FIG. 1 showing an optional latch arrangement which may be used at the top rail.

FIG. 3 is a detailed view in cross-section taken from line 3—3 of FIG. 2 looking in the direction of the arrows.

FIG. 4a is a vertical view and cross-section taken of the upper portion of the window showing, in particularly, the upper sash taken from line 4—4 of FIG. 1 looking in the direction of the arrows.

FIG. 4b is a continuation of the view of FIG. 4a showing the lower sash and taken from line 4—4 of FIG. 1 looking in the direction of the arrows, FIG. 4b being the bottom half of the view of FIG. 4a.

FIG. 5 is a cross-sectional detail of the rail and stile.

DESCRIPTION OF THE PREFERRED EMBODIMENTS

Figure 1:
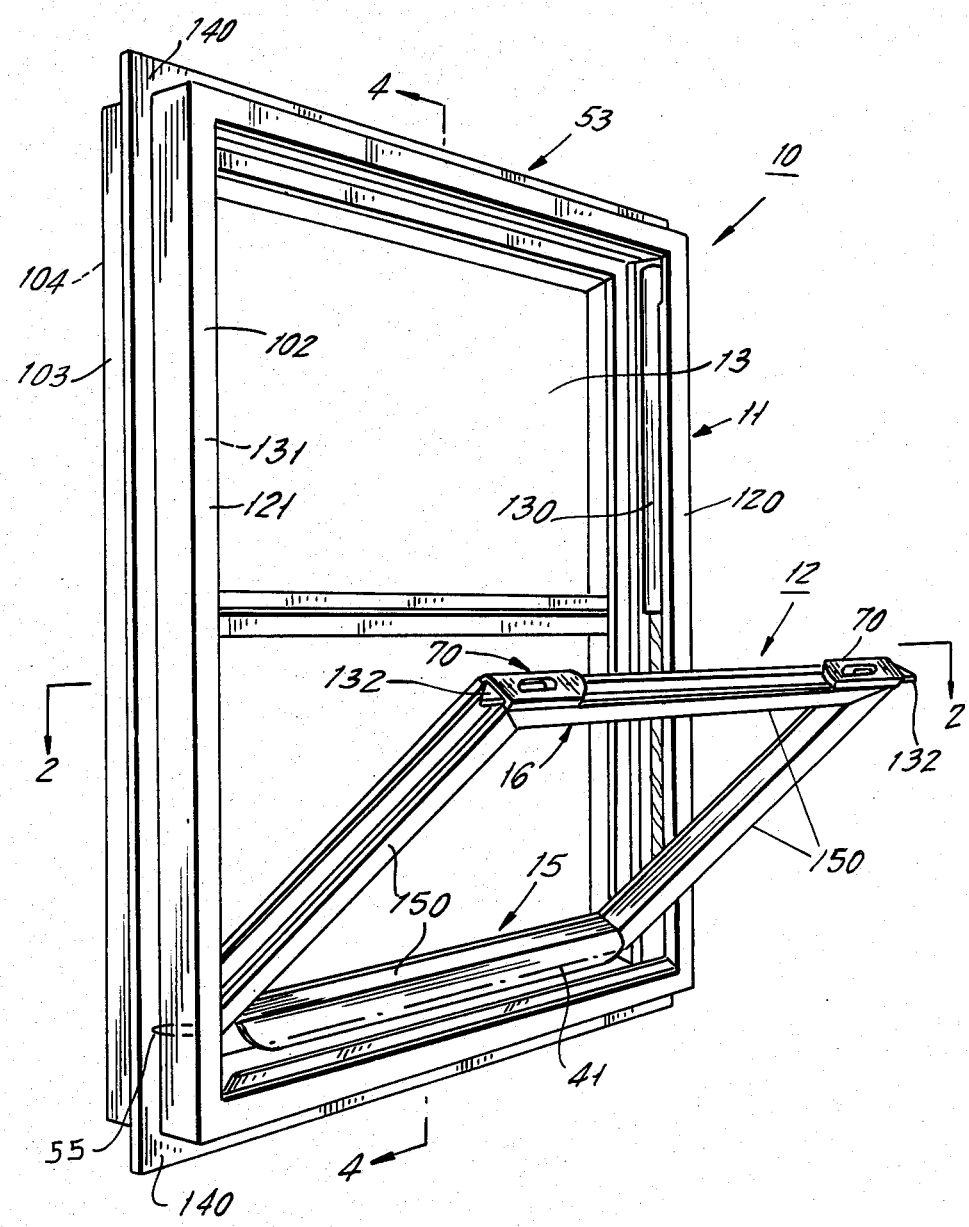
FIG. 1 is a view in perspective of a window having a lower sash embodying the present invention.

The window 10 shown in FIG. 1 comprises a frame 11, a lower operating sash 12 which is arranged to be tilted out of the plane of the frame, where desired, and an upper fixed lite 13.

Referring to FIG. 4b, the lower sash 12 comprises the lower lift rail 15 and the upper rail 16. The lower lift rail has the bottom wall 20 and the top wall 21 interconnected by the outer wall 22 and the inner wall 23. The outer wall 22 and the inner wall 23 are essentially parallel being spaced by the top wall 21 as well as the exterior bottom wall 20. In addition, the two walls are appropriately spaced from each other by the inner boss 25 which constitutes a spacing and support member which may be longitudinal, if desired, and may extend along the length of the two walls parallel thereto. Further, the outer side wall 22 is extended at 22a and bent from an inner boss or spacing and support member 27 connecting it to the bottom wall 21. A bracing boss 28 is provided between the outer wall 22 and the inner boss 27. The boss 27 preferably extends the length of the extrusion and that is the length of rail. In the same way, the inner wall 23 is vertically extended at 30 above the top wall 21 and terminates in a ledge 31 substantially aligned with the ledge 32 between the extension 22a of the outer wall 22 and the boss 27 at the outer wall.

The ledge 31 is connected to a longitudinal boss or support member 32 which is substantially parallel to at least a portion of the vertical extension 30 of the wall 23 and integral therewith. The boss or support member 32 is integrated with the upper wall 21 of the extrusion. The section 34 of wall 21 between the boss 32 and the upward extension 30 of wall 23 forms an additional reinforcing boss. The lower rail extrusion thus is provided with a series of reinforcing elements which form a plurality of substantially parallel longitudinal cells or recesses which thereby strengthen the extrusion itself as well as providing appropriate support for various elements as hereinafter described.

The upper rail 16 has substantially the same construction as the lower rail 15 and has been given the same reference numbers where they match the structure of the lower rail with the addition of the letter "b".

Note that the securement screw 40 at the lower rail and 40b at the upper rail has not here been described for the present since a full understanding of the function of the screw will become clearer from a description of the vertical stiles.

As far as the lower sash 12 is concerned, the lower rail 15 may be arranged so that the extension 32 of its upper wall may be further extended at 41 to provide a lift handle. The lift handle may extend over a relatively short distance at the lower rail or a pair of such lift handles may be used. Preferably, as shown in FIG. 1, the lift handle 41 will extend across the entire length of the rail. In addition, one or more latches may be provided for the lower rail either at the center or at opposite sides. For this purpose, the lower rail is provided with a pivotally mounted lock member 42 having an extension 43 ending in a ball or cylindrical member 44 snapped into the recess 45 on which it may pivot. The handle 42 has a latch member 50 extending downwardly having the detent 51 which engages the stationary detent 52 in the window frame structure 53. The engagement of the detents 51 and 52 will prevent raising of the sash 12; however, the latch member 42 may be raised by a finger to pivot around the ball or cylinder 44 in the recess 45 to disengage the detent members 51, 52 to permit the sash to be lifted. A spring member 60 is provided between the latch member 42 and the lift handle 41 to bias the latch member 42 downwardly into position where the detents 51, 52 interengage. This bias may be defeated by upward finger pressure on the latch member 42.

The lower sash may pivot on the pivot bar 55 (FIGS. 1 and 4b) carried by the lower rail 15 as shown in FIG. 1 to provide access to the outer surface of the lower sash.

At the top of the sash 12, a finishing piece may be provided on the top rail 16 which finishing piece 70 may, as seen in FIGS. 1, 2 and 3, house a latch member hereinafter described.

In addition, the rails 15 and 16 may be provided with appropriate recesses 71, 72 to receive and retain sealing members 73, 74. The top rail is provided with similar elements 71, 72 because the extrusion die provides such elements even though they are not necessarily needed at the top rail 16. The lower rail 15 and the top rail 16 have longitudinal channels 81 and 81b formed by the walls 32 at the bottom rail 15 and 32b at the top rail 16 which receive the top and bottom of the double window pane 80, which comprises a pair of window panes 83, 84 appropriately supported and spaced by the internal window pane rail 85. In addition, the surfaces of the walls 32, 32a or 32b and 32ab facing the window pane are provided with appropriate sealing elements 86 to provide an appropriate weather seal at the connection of the pane with the rails. The lower rail 15 of the sash, when it is lowered into the frame 53 of the window, enters into the channel 100 of the lower section of the window frame 53, which is formed by an appropriate extrusion or structure, having the outer walls 102, 102 and the bottom wall 103 and the inner wall 104.

In addition, the channel 100 of the frame 53 is formed by the walls 110, 111 of the frame to provide an appropriate seat and receptacle for the rail 15, and especially the sealing element 73 facing outwardly and the sealing element 74 facing downwardly. The frame member 53 may be provided with appropriate bosses as shown which will rigidify and strengthen the frame at the sill to provide appropriate support for the rail 15 when it is lowered. It should be noted that the longitudinal center section of the rail 15 does not meet directly with a portion of the frame thereby providing for appropriate drainage below the wall 20 of the rail 15 and the interior sections 111, 112, 113 of the frame 15 may be provided with appropriate drainage where that is desirable.

FIGS. 2 and 5 show the structure of the vertical stiles and FIG. 2, especially, shows the outer and upper sash structure. The outer sash structure is not a part of the present invention. It may be a stationary structure as indicated or the window may be a double-hung window. The essence of the invention is illustrated with respect to the lower sash which has been described. The frame members 120, 121 of the window frame provide appropriate channels 130, 131 for the latch member 132 on each side to slide as the sash 12 is moved up and down. The latch members will be hereinafter more specifically described. The window frames 120, 121 in which the windows are set of course line the window opening and are integrated with the building. The channels 130, 131 provide a slide slot for the latch 132. This slot, since the windows are supposed to be capable of being swung open, is the only support which is provided for maintaining the window sash vertical during its operation. Thus, the outer frame members 120, 121 for the window itself and which provide appropriate support for the sashes are secured to the building structure by appropriate fastening means which enable the frame members 120, 121 to be positioned with respect to the building structure such as the flanges 140 and the screws 141 as well as other elements.

The window frame stile 150 on the left side facing the window shown in FIGS. 2 and 5, and the identical but reversed window frame stile on the right side facing the window from the interior have a channel 151 to receive the sash 12 which is lined with appropriate weather excluding sealing means 153. The stile is also provided with the rcesses 154, 155 which support the sealing member 156, 157 which slide against the guide walls of the frame members of the frame to provide appropriate weather tightness.

The latch housing 70 at the top rail, as seen in FIGS. 2 and 3, is a housing which supports the sliding latch 132 which is extended back to the body 160 which may be slid back and forth in the housing 70 to cause the latch 132 to enter into the channel 131 to support the window. The latch may be removed from the channel 131 to permit the sash to swing into the position shown in FIG. 1. The latch housing 70 may be positioned by the screw 200 at the corner which serves also as hereinafter described to integrate the rail and the stile at the miter joint and may be further positioned against twisting or skewing out of the proper position by the additional screw 180.

Figure 6:
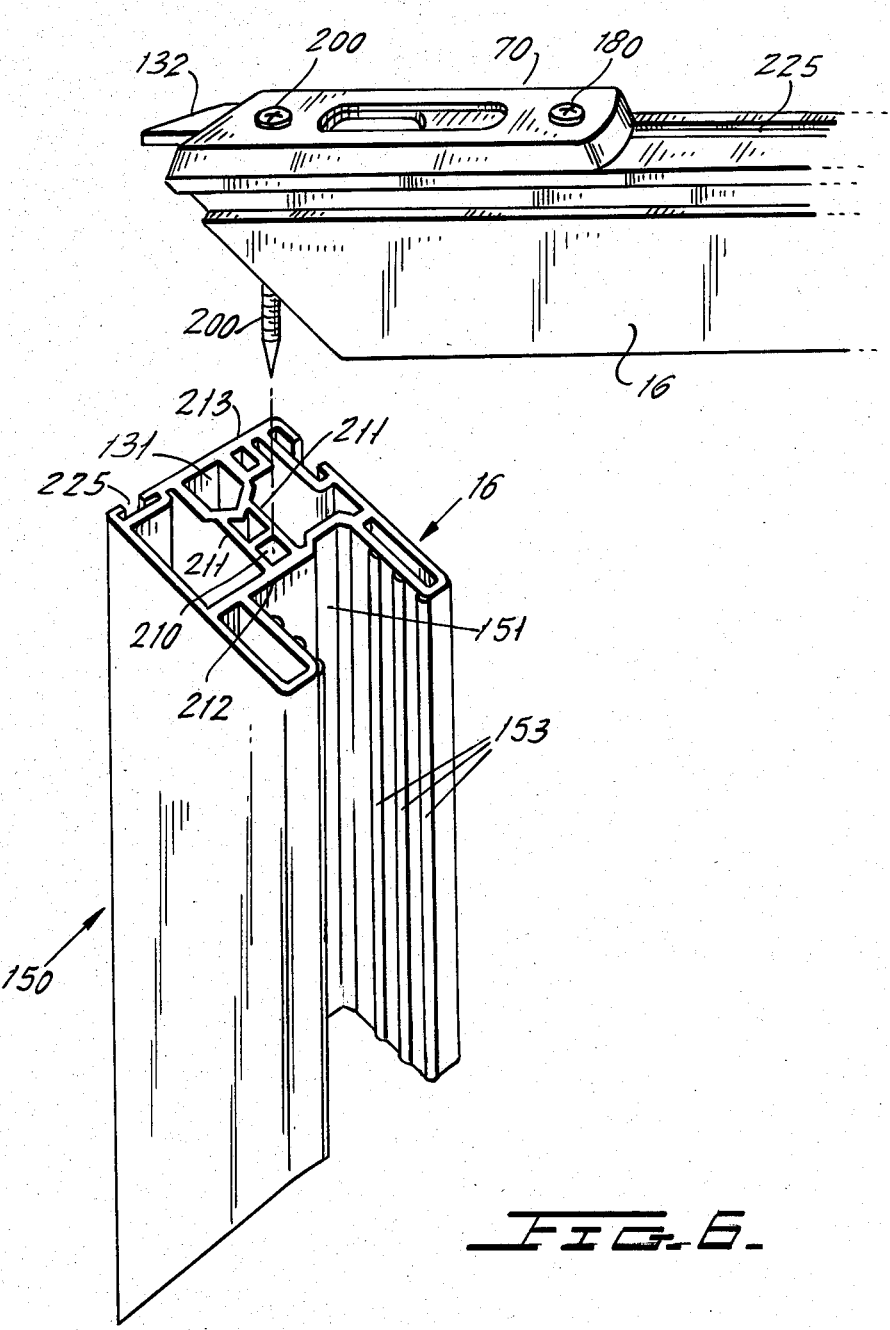
FIG. 6 is a view in perspective of the novel corner elements of the invention.

The essential element of the invention is the utilization of the single screw 200 in order to integrate the structure. The screw 200 is shown at the bottom of FIG. 2 as well as in FIG. 3 and also in FIG. 4b. Referring first to FIGS. 4b and 6, the screw 200 when inserted to engage the stile is inserted through the pivot bar 201 which is held in the pilot webs 202, 203 which support the boss 25 and form, in effect, a small housing for the pivot bar 201. The pivot bar slides up and down in the guide channel 131 in the frame. The screw 200 goes through the pivot bar and fixes it. If necessary, the pivot bar may be arranged so that it is fully supported within the pilot web 202 for the boss 25 and fixed in position by the screw 200. The screw 200 passes through the boss 25 and then into the longitudinal portion 210 of the stile 150. This longitudinal opening is formed by the support wall 211 between the inner wall 212 of the stile 150 and the outer wall area 213, thereof. The screw is larger in diameter than the opening 210 and must form its own thread as it is introduced. This occurs at each corner. The screw enters from the top wall of the two ends of the upper rail into the longitudinal opening 210 of the sash stile and it enters from the bottom rail into the corresponding opposite end of the longitudinal opening 210. The boss 211 forms an appropriate support between the walls to rigidify the extrusion forming the stile. The screw is positioned so that it will not move away from the axial position of the stile by reason of its encasement in the opening 210. It is also positioned in the bottom or top rail by the opening 210 at each end.

Thus, the mitered condition is at all times maintained. The elements cannot slide off the miter position. The outer walls of the extrusion are dimensionally fixed and the inner walls are also dimensionally fixed by the various bosses. The latch 132 and its support member 160 are slideable in the housing 70. Support member 160 is provided with appropriate openings 222 so that the latch support may pass on either side of the support of the connecting screw 200 and the housing itself may position the latch support 160 by itself or in conjunction with additional guides such as the guide 225 which cooperates with a groove on the underside of the latch housing 70 to position the housing which, in turn by inner bosses 226, 227, positions the latch support.

In addition, as is obvious from the lower end of FIG. 4b, the pivot bar 201 will extend out of its guide 202. If desired, the pivot bars may be slid back and forth in the guide 202 to permit the entire sash to be withdrawn.

The opening in the boss 201 for receiving the screw may be countersunk in order to receive the screw head. The pivot bar, as is obvious, is completely encased and, in fact, concealed by the wall 20 of the extrusion. Thus, an exterior pivot bar is avoided and the consequent damage to the unit which might occur from an exterior pivot bar which for a long period of time may rest in the trough in the frame at the lower end of the sill accumulating moisture, dust and corrosion, is avoided. This is in contrast with prior structures wherein the pivot bar support is exterior at the lower portion of the sash frame and thus is accessible to corrosive substances in the bottom channel of the frame and to atmospheric conditions.

By the structure herein disclosed, a simplified means of integrating the four sides of the window sash in order to form a complete sash is provided. The utilization of a single screw at each corner going through a boss on the horizontal rail at each corner and into a longitudinal recepticle in the stile, fixes the position of the screw and thereby fixes the position of the stile with respect to each of the rails. This prevents sliding along the miter joint and maintains the desired condition of the frame. The utilization of the bosses which support the screw and also support the walls of the stiles and the rails, prevents sagging, distortion or breakage of the opposite walls of the rails and stiles and thereby preserves the integrity of the unit. The pivot bar is secured by the same screw at each of the two lower corners and fixed along its longitudinal axis by being secured within a rail reinforcing boss. The support elements of the pivot bar are concealed and protected from external phenomena by being completely encased except for the portion which emerges into the frame. The latch member, which may be used on each side at the upper edge of the rail to secure the sash in its normal vertical condition, is readily retractable and slideable in its own housing which, in turn, is supported and positioned by the same screw which integrates the stile and rail at each corner.

The entire unit is thus assembled with a minimum of parts and manufacture, installation, servicing and construction are thereby simplified. The present invention relates to the lower swing out sash. The window frame may be a standard window frame within the requirements that the sash be vertically slideable and capable of being pivoted and swung out.

As above pointed out, the advance of this present invention is the creation of a window sash with a minimum number of parts that can be put together readily by a simple operation and that can be installed without difficulty. This eliminates all of the ordinary hardware components that are normally used in the lower sash which is put together with corner gussets or other hardware or reinforced with aluminum extrusions. The sash is laminated to the glass by long beads of adhesive between the sealing lips herafter described.

While the pivot bar, per se, at the lower end of the lower sash is known, the usual method of construction has been to insert the pivot bar in each corner extending laterally from the sash and position it with two screws since one screw would otherwise permit the pivot bar itself to pivot with respect to the sash. In order to obviate this result, a channel is provided in the extrusion to receive the pivot bar and the pivot bar is a sliding fit in the channel and has extremely limited movement laterally in the channel.

Where it is desired to make the pivot bar retractable, an appropriate slot may be placed in the pivot bar around the screw while the pivot bar is nevertheless fully guided and positioned by the channel in the rail. Where such longitudinal movement of the pivot bar is permitted to provide for removal of the sash from the frame, an appropriate spring may be utilized to make sure the pivot bar is extended.

In the present invention, the utilization in the extruded rails and stiles of longitudinally extending support members between the walls of the rails and stiles and the utilization of bosses at appropriate positions serves to support the various walls with respect to each other and therefore prevent crushing of the rails and stiles, breaking of the structure or sagging or disorientation of the structure. The utilization the screw going through a tight fitting hole through which it must make its own thread in the boss in one of the rails and into a receiving longitudinal opening in the stile, where again it must make its own thread, serves to integrate the stiles and rails by the single screw at each corner and prevents such relative movement as would in any way disorient the sash or cause the miter joint to slide.

The ability to resist compression is important in a plastic extrusion which may otherwise bend resiliently under compressive forces. The utilization of the single screw and the utilization of corresponding support elements in the rail and stile insures the integrity of the miter walls. For ease of assembly and to insure the integrity of the structure, the screw is always inserted in the present structure through the rail and into the stile. That is, it is inserted through an opening in a boss in the rail and into the longitudinal support member, channel or boss in the stile. The fact that the screw forms its own thread as it is inserted, also insures that it forms not only its own means of securement, but its own weather seal. The screw thus passes through at least three aligned openigns, thereby making certain that the screw will be exactly perpendicular to the rail and will not wobble as it enters into the stile, thereby, again, ensuring that the miter joint will be perfect.

It has been common to utilize two screws to prevent lateral slip. This in itself requires some means of retention during manufacture to prevent the slip from occurring and being frozen. In the present device, the lateral slip is obviated even though only a single screw is used.

In addition, the latch housing is provided with two bosses, one of which enters the opening through which the screw passes and the other of which enters an opening in the rail. These bosses are not securing means, they are positioning means. The screw passing through the rail in the latch housing into the stile performs the securing operation. The additional bosses on the latch cover are further provided to rest just at the outer perimeter of the opening in order to provide support while the screw is being forced through the rail and into the stile. The utilization of the additional bosses and additional support members on the rails provide an appropriate anchor for other attachments as, for instance, if a center lock is desired on either the top rail or the bottom rail, or both.

The utilization of a plurality of parallel walls, which are supported with respect to the outside walls, provides an appropriate anchor for any screw which may be inserted to make its own thread as it is inserted. It should be kept in mind, as previously mentioned, that the utilization of the bosses, including the spacing elements on the additional walls, provides a multiplicity of dead air spaces. Instead of a single dead air space in which there can be a great deal of convection, the utilization of the bosses provides a minimum of three dead air spaces in each of the rails and stiles through which there must be conduction through a plastic material which is not heat conductive, plus smaller convection spaces so that there is less room for the air to circulate. This provides true dead air space construction and a substantial increase in the heat insulation properties of the rails and stiles. This, in conjunction with a double pain sash, further increases the heat insulating properties of the window.

As above pointed out, the utilization of the bosses provides internal support so that when punching holes through the extrusion, it is not necessary to use supports for the internal sections of the extrusion to maintain their integrity as the die goes through.

In the foregoing, the present invention has been described solely in connection with preferred illustrative embodiments thereof. Since many variations and modifications of the present invention will now be obvious to those skilled in the art, it is preferred that the scope of this invention be determined not by the specific disclosures herein contained, but only by the appended claims.

What is claimed is:

1. A window sash comprising at least one pane and having an upper rail, a lower rail and a pair of vertical stiles; each of said rails and stiles being an extruded unit having a plurality of parallel walls sapced from each other in each rail and stile; each of the rails and stiles being mitered to form a miter joint; each of the rails and stiles comprising a generally channel-shaped member having an outer wall normal to the plane of the sash and a pair of the aforementioned parallel walls extending normal to the outer wall;
   a further plurality of additional wall members in each of the rails and each of the stiles extending normal to the first-mentioned outer walls and parallel to the first mentioned additional walls secured thereto, said rails and stiles forming a pane support;
   an additional spacing and support member at each end of each stile and additional horizontal reinforcing members parallel to the first-mentioned wall of each of the rails; and
   a screw at each of the mitered corners passing from the outer surface of each rail through the rail and through the additional horizontal walls and into the end of the adjacent stile; said screw forming its own thread as it penetrates the outer wall of the rail, the spacing and support members within the rail and the boss within the stile; the screw being supported at a plurality of locations coinciding with the walls of the rails perpendicular by the screw along its length in the rail and being supported along at least part of its length in the stile whereby the miter joint integrity is maintained against distorting forces imposed on the sash.

2. The window sash of claim 1, wherein the lower of the two rails carries a pivot bar extending therefrom such pivot bar being adapted to enter and slide in a window frame channel.

3. The window sash of claim 2, wherein said pivot bar is supported between a pair of said additional walls in said sash and is secured in position by said screw at the lower rail.

4. The window sash of claim 3, wherein the pivot bar is provided with an opening surrounding said screw but not fully engaging the same; said pivot bar being slidable in said rail with respect to said screw.

5. The window sash of claim 1, wherein a lift bar is provided at the lower rail.

6. The window sash of claim 1, wherein a latch member is provided at the lower rail, releasably engageable with a corresponding latch member on the frame in order to lock the window in the down position.

7. The window sash of claim 2, wherein a releasable latch is provided at the upper rail of the sash, extending laterally beyond the sash; said sash being mounted in a frame; said frame having a channel in which said extended latch rides; said latch being retractable from said channel to permit the sash to swing out around the pivot bar.

8. The window sash of claim 7, wherein said latch is longitudinally slidable along the upper rail; said latch having a housing positioned on the rail; said screw passing through said housing into the rail and the stile to form the miter joint; said latch having an opening surrounding but having edges spaced from said screw to permit the latch to slide longitudinally.

9. The window sash of claim 8 having a restoring spring on said latch.

* * * * *